C. H. CLARK, E. W. JANSEN & C. F. GAILOR.
EXPANSION RAIL JOINT.
APPLICATION FILED FEB. 23, 1917.
1,301,104.
Patented Apr. 22, 1919.
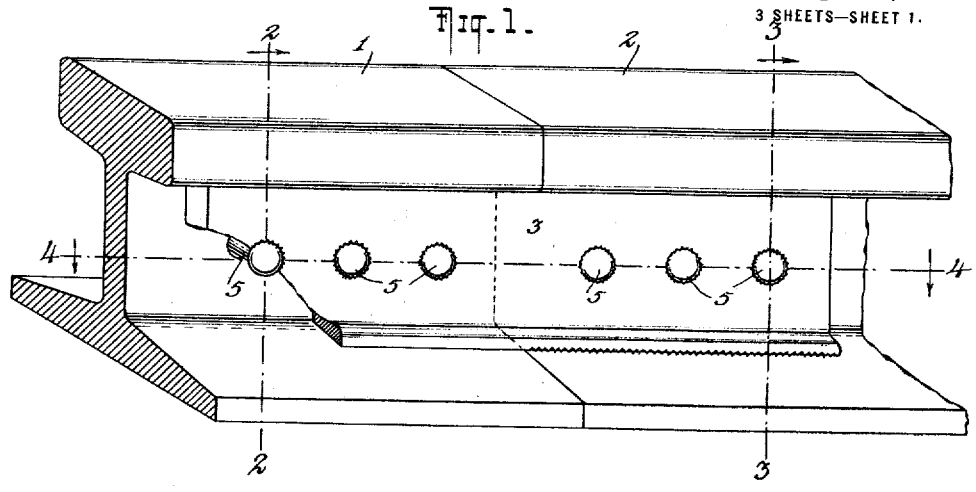
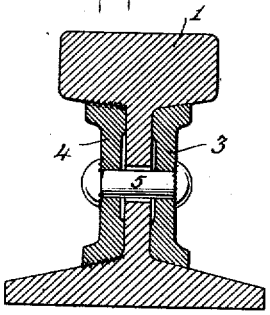
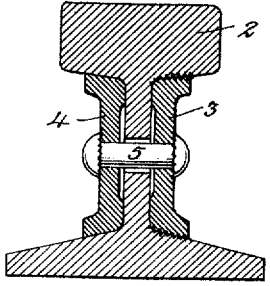
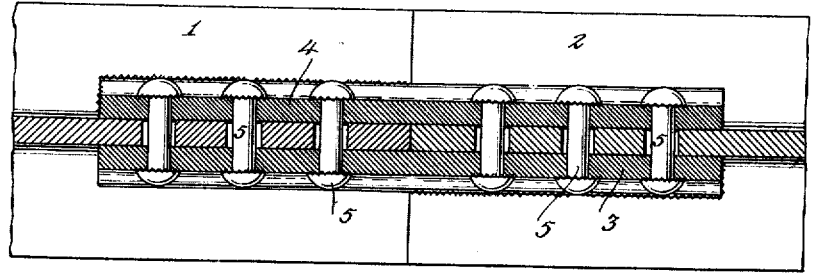
WITNESSES
INVENTORS
CHARLES H. CLARK
EDWARD W. JANSEN
CHESTER F. GAILOR
BY
ATTORNEYS C. H. CLARK, E. W. JANSEN & C. F. GAILOR.
EXPANSION RAIL JOINT.
APPLICATION FILED FEB. 23, 1917.
1,301,104.
Patented Apr. 22, 1919.
3 SHEETS—SHEET 2.
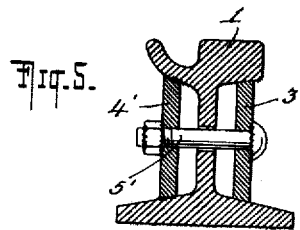
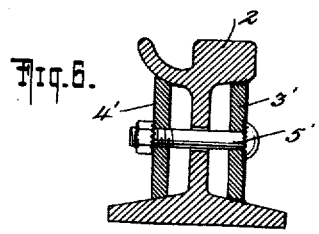
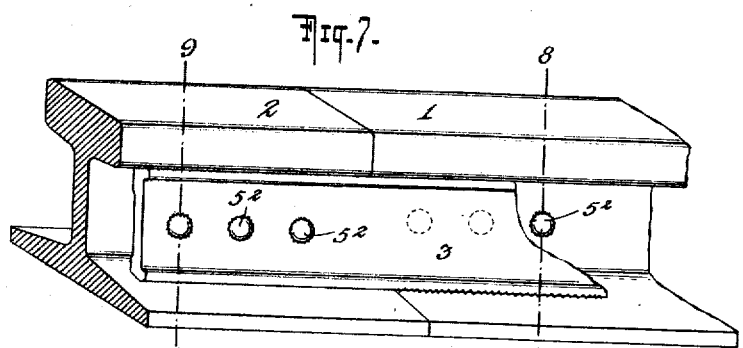
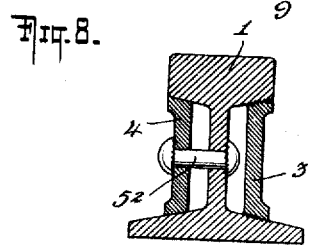
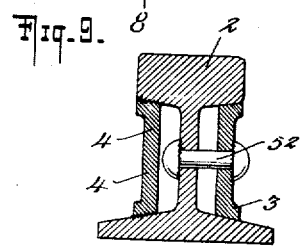
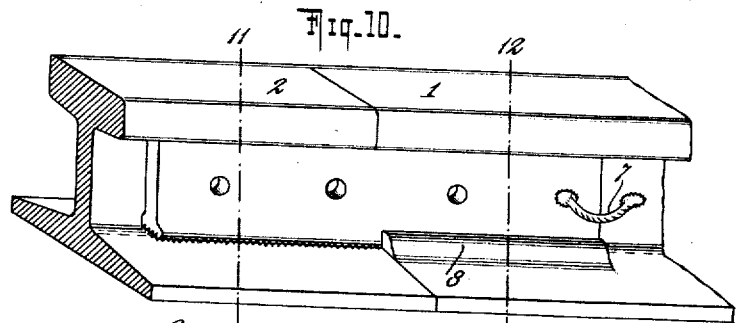
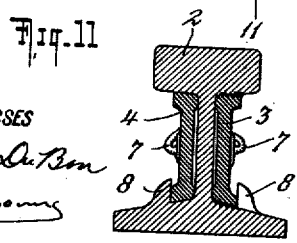
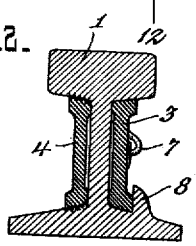
WITNESSES
INVENTORS
CHARLES H. CLARK
EDWARD W. JANSEN
CHESTER F. GAILOR
BY
ATTORNEYS

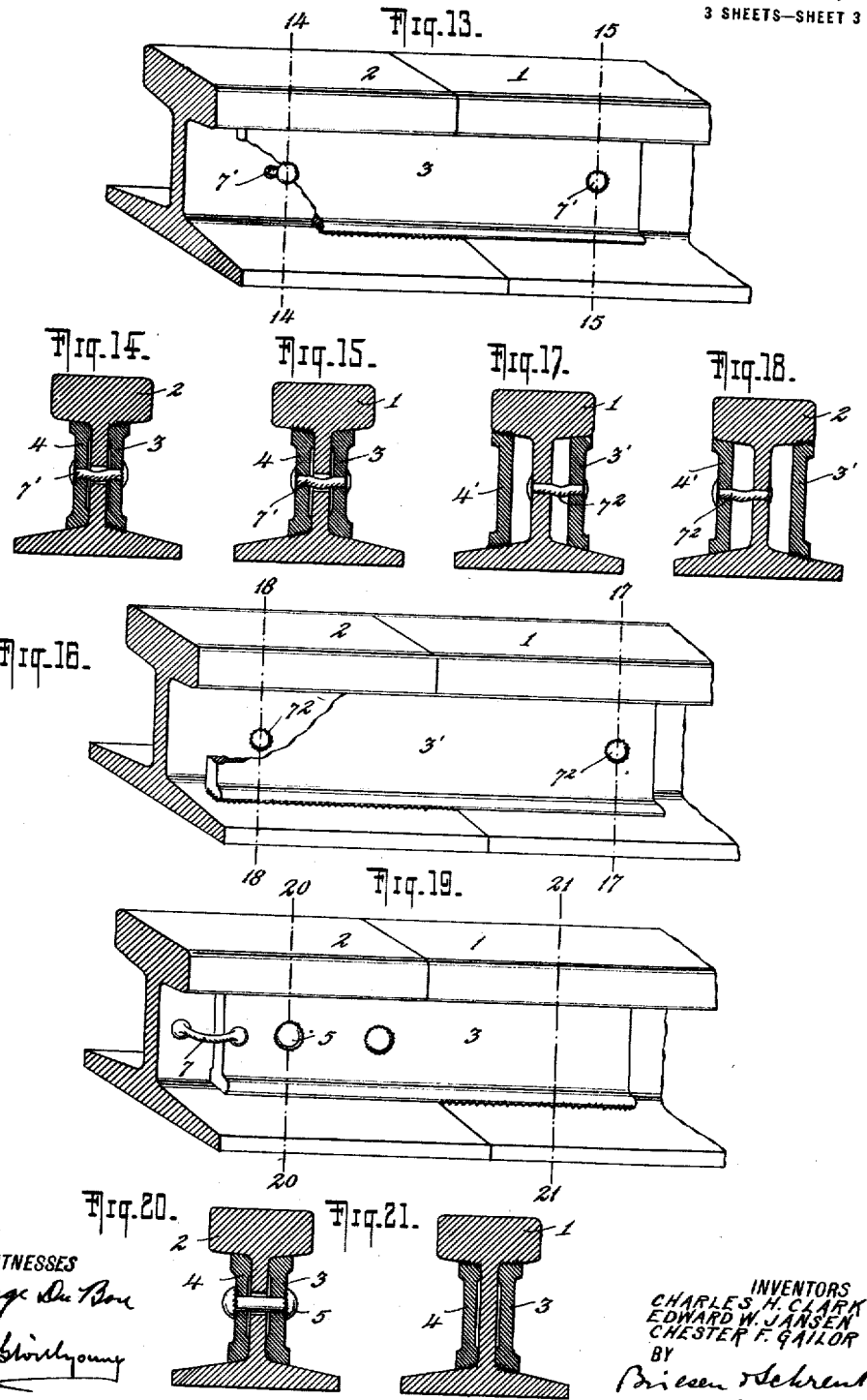

UNITED STATES PATENT OFFICE.

CHARLES H. CLARK, OF CLEVELAND, OHIO, AND EDWARD WALTER JANSEN, OF NEW YORK, AND CHESTER F. GAILOR, OF BROOKLYN, NEW YORK, ASSIGNORS TO ATLANTIC WELDING CORPORATION, OF NEW YORK, N. Y., A CORPORATION OF NEW YORK.

EXPANSION RAIL-JOINT.

1,301,104.      Specification of Letters Patent.      Patented Apr. 22, 1919.

Application filed February 23, 1917. Serial No. 150,398.

*To all whom it may concern:*

Be it known that we, CHARLES H. CLARK, EDWARD WALTER JANSEN, and CHESTER F. GAILOR, all citizens of the United States, and residents, respectively, of Cleveland, Cuyahoga county, State of Ohio, of New York, in the county and State of New York, and of Brooklyn, Kings county, city and State of New York, have invented certain new and useful Improvements in Expansion Rail-Joints, of which the following is a specification.

Our invention relates to expansion rail joints for railway track systems and particularly to such joints when applied to a track system as used in electric railway service or where the track must be used as an electrical conductor in a signaling system. Under such conditions it is necessary, or at least very desirable, that the electrical conductivity of the joint shall approximate, as nearly as possible, the conductivity of the track itself.

Our improved joint can not only be given the requisite electrical conductivity, as above specified, but is also so constructed that the rails which are connected by the joint are always rigidly held in alinement and yet may freely expand or contract on account of temperature changes without affecting said conductivity.

In modern track construction for electrical railways it has become a quite usual procedure to connect the individual rails together, so as to form a continuous length, by means of welding. In thus uniting the rail ends the welds may be butt welds, or fish plates may be welded to the sides of both rail ends, or both fish plates and butt welds may be used at one and the same time.

When welded joints as just described are employed, breaks, due to various reasons more or less well understood by those skilled in the art, are found to frequently occur. Regardless of the location of such breaks, a repair is always costly inasmuch as rail portions adjacent to the break must be accurately cut away and a short length of new rail section "cut in" to take its place. Excavation and repaving also add their increment of cost.

It is the object of our invention herein disclosed to provide a joint which shall do away with the disadvantages, inconvenience and expense entailed by the older types of joint, as just described, and which shall permit the rails to expand or contract in correspondence with temperature changes, thus closing or opening the gap at the joint, while at the same time maintaining the electrical conductivity at a constant but high value and unimpaired. It is a further object of our invention to provide a joint of the character described in which, should the strains become excessive, any rupture will be confined to a part which can be readily, quickly and cheaply replaced without cutting of the rail proper.

Broadly speaking our improved joint comprises two abutting rail ends held together by fish plates each of which is welded to one rail but not to the other and both of which are so disposed with reference to the rail ends that, while the rails are always held in rigid alinement, each rail is free to slide linearly with reference to the fish plate to whose end it is not welded; with this arrangement is provided a bond or other equivalent means for obtaining and maintaining good electrical conductivity between the free end of a fish plate and the adjacent rail end to which it is not connected.

Our invention will be better understood by referring to the accompanying drawings, in which Figure 1 represents a perspective view of a preferred construction of the joint as applied to a pair of rail ends of conventional T section; Figs. 2 and 3 are, respectively, transverse sections taken along the lines 2—2 and 3—3 of Fig. 1; Fig. 4 is a horizontal section taken along the line 4—4 of Fig. 1; Figs. 5 and 6 are sections, corresponding respectively to the sections shown in Figs. 2 and 3 but taken through a modified form of joint as constructed in connection with rails of the usual girder type; Fig. 7 is a perspective view, showing a modified form of the invention as applied to T rails, and Figs. 8 and 9 are respectively transverse sections taken along the lines 8—8 and 9—9 of Fig. 7; Fig. 10 is a perspective view of another modification of the joint of our invention, as applied to T rails, and Figs. 11 and 12 are respectively transverse sections taken along the lines 11—11 and 12—12 of Fig. 10; Fig. 13 is a perspective view of still another modified form of our joint, as applied to T rails, and Figs. 14 and 15 are respectively transverse sections taken along the lines 14—14 and 15—15 of Fig. 13; Fig. 16 is a perspective view of another modified form of joint according to our invention, as applied to T rails, and Figs. 17 and 18 are respectively transverse sections taken along the lines 17—17 and 18—18 of Fig. 16; Fig. 19 is a perspective view of still another form of the joint of our invention, as applied to T rails, and Figs. 20 and 21 are respectively transverse sections taken along the lines 20—20 and 21—21 of Fig. 19.

Referring to the drawings (Figs. 1–3) 1 and 2 represent adjacent abutted ends of T rails, while 3 and 4 represent a pair of laterally disposed flanged fish plates of usual construction. These plates extend the full distance from the rail head to the rail base and are welded along their upper and lower edges, one end of one plate to the under side of the head and upper side of the base belonging to one rail end only and the other plate to the corresponding surfaces of the other rail end only.

Bolts 5 pass through the ends of opposite plates and through the intervening rail web and are welded fast at each of their ends to said plates. These bolts should, as is usually the case, be chosen substantially smaller in diameter than the hole 6 in the track web through which they must pass.

In constructing the joint just described, the rail ends are in contact, of course, when the joint is made. As the newly constructed joint cools, contraction will take place and rail end 2 with the attached fish plate 3 will move to the right while rail end 1 with its attached fish plate 4 will move to the left. Owing to the fact that the holes in the track web are a little larger than the bolts connecting the plates and passing through said holes, these bolts will merely be bent horizontally through a small angle. If the contraction is not excessive, so that the angle of bending remains within the elastic limit of the material of the bolt, no breakage will take place and, when expansion again takes place under the influence of the rise of temperature, the bolts will again straighten out.

It will be noted that the above described joint provides a continuous metallic connection from one rail to the next without passing over any intervening contact surfaces. The bolts belonging to one track end must, for the purpose of electrical conductivity, be considered as arranged in parallel with one another; by increasing the number of bolts, the conductivity may, of course, be proportionately increased.

It will be also noticed, in the above construction, that the greater the contraction the more firmly the plates 3 and 4 will be drawn together and against the intervening rail web. This is due to the bending of the bolt and the consequent shortening of the distance between the bolt heads as projected on a plane perpendicular to the track length.

Should the contraction be excessive any breakage which may take place will necessarily take place at the weakest point, viz., at the bolts. These being cheap and easily gotten at may be cheaply and easily replaced.

In Figs. 5 and 6 we have shown a modified form of our invention. Here it is applied to the usual girder rail employed in embedded construction as in urban street railways. The same arrangement of joint may, however, be equally well applied to the T rail. Here the fish plates 3', 4' are not provided with flanges and they are also spaced at a substantial distance away from the rail web in order to better support and strengthen the overhanging portions of the head. One end of plate 3' is welded at its top and bottom edges to one rail while the other end of plate 4' is similarly welded to the other rail. The bolts 5' pass through both plates and the intervening rail web. As here shown, the bolts have the usual half round head at one end and a thread and nut at the other. To secure the requisite conductivity each nut should here be welded to the adjacent plate and also to the shank of its bolt.

In Figs. 7, 8 and 9 there is shown another modification of the invention, differing from the forms shown in Figs. 5 and 6 principally in that the rails are of T section and that the plates are flanged plates instead of unflanged plates. A further difference is that the bolts $5^2$, instead of extending from outside to outside of opposite places, merely extend from one side of the rail web to the outer side of the opposite plate. The bolt heads are welded fast to the rail web and to the plate as indicated. This form of the invention has the advantage that short bolts can be used at a consequent substantial saving.

In the form of the invention shown in Figs. 10 and 12, flanged plates are again used with T rails as in the form shown in Figs. 1 to 3. Bolts are omitted, however, the necessary electrical connection between each free plate end and the rail end to which it is not welded being secured by the use of a flexible copper bond 7 which is welded, one end to the rail and the other end to the plate. In this particular form also a rib 8 is welded fast to the base of each rail end on that side which has no fish plate end welded thereto. This rib is positioned so as to hold the bottom edge of the flanged fish plate snugly in position against the adjacent rail end. There is thus no danger of the fish plate being forced outward laterally by reason of the strains due to traffic passing over the rails. In practice it is found that a rib on the base of the rail is sufficient in this form of construction inasmuch as the stiffness of the fish plate will prevent its being forced out laterally along its top edge. However, a rib may also be formed upon the under side of the rail head to engage the upper edge of the fish plate, if such arrangement be desired. While bolts are omitted in this last form of the invention, we nevertheless provide the fish plates with bolt holes and employ bolts temporarily to hold the plates and web together while the plates are being welded fast. The bolts are then removed.

In the form of the invention shown in Figs. 13 to 15 the arrangement is substantially as shown in Figs. 10 to 12 except that the rib 8 is not used; while the bonds 7' have their ends welded fast to the opposite bolt holes of the two fish plates, the bond passing through the rail web. Here the diameter of the bond will usually be very much less than the diameter of the hole in the rail web, and inasmuch as the bond is naturally very flexible and should have a small amount of slack, the joint will open and shut under temperature changes very freely. Here reliance upon the plates not springing is dependent upon the intrinsic stiffness of the plates.

The modification shown in Figs. 16 to 18 is similar to that shown in Figs. 13 to 15 except that the fish plates are spaced from the web, as in Figs. 7 to 9, while the flexible copper bonds 7² merely extend from fish plate to rail web.

In the form shown in Figs. 19 to 21 the rail is of the usual T section and the fish plates of the flanged type as in Figs. 1 to 3. The essential characteristic of this form, as compared with the previous forms described, is the fact that similar ends of both plates are welded along their top and bottom edges to corresponding surfaces of one and the same rail end while the edges of the other ends of both plates are free of the other rail end. As expansion and contraction takes place, therefore, both fish plates move with one rail end and are unaffected by the movement of the other rail end. The requisite electrical conductivity between the free rail ends and the free ends of the fish plates is obtained by welding a bond or bonds between the free ends of the fish plates and an adjacent point or points on the free rail end.

Wherever, in describing the several forms of our invention above, we have referred to a particular type of rail section, any other usual type of rail section could be substituted therefor within the scope of the invention. Similarly, the number of bolts or bonds to a joint or the number of joints employed to a given track length, can be varied as required. The fish plates, also, may generally be either flanged or flat without affecting the resultant joint other than in degree. Other changes, in the specific way in which the several structural features of the joint are combined, will readily occur to those skilled in the art.

Where we have used the term "bolt" or "bolts" in this text, we have used it in the generic sense as meaning any fastening device of the pin type adapted to have its ends expanded in any preferred way to serve as clamping members. The pins may, therefore, be "upset" at one or both ends, as in riveting, or nuts or the equivalent may be used at one or both ends. Usually the particular kind of bolt employed will be merely a matter of individual judgment.

Joints, according to our invention, may be installed between each and every pair of rails or at determined distances along the track, the intervening joints being plain welded non-expanding joints of any preferred construction.

It is obvious, of course, that copper bonds and bonds in the form of bolts may be used simultaneously in many forms of joints within the scope of our invention and to advantage. In such case should the bolts rupture, under excessive strain, there would not be any serious decrease of conductivity. Furthermore, if the bolts are not welded fast to the parts replacements would be exceedingly easy and inexpensive.

While the various modifications shown all employ two fish plates, one on each side of the rails, and while such is the preferable arrangement, we may omit the fish plate on one side of the joint in some cases. Where rails are used only as signaling conductors this one plate is specially applicable.

Having described our invention, we claim:

1. An expansion rail joint comprising a pair of alined rail ends, fish plates on opposite sides of said rail ends each plate having one end welded to one rail end and the other end slidably engaging the other rail end and a bolt passing through the web of the rail and having one end continuous metallically with the free end of a plate and the other end completing metallic connection to the juxtaposed rail end.

2. An expansion rail joint comprising a pair of alined rail ends, fish plates on opposite sides of said rail ends each plate having one end welded to one rail end and the other end slidably engaging the other rail end and a bolt passing through the web of the rail and having one end welded to the free end of one plate and the other end welded to an end of the other plate.

3. An expansion rail joint comprising a pair of alined rail ends, fish plates on opposite sides of said rail ends one plate having one end welded to one rail end and its other end slidably engaged with the other rail end while the second plate has one end welded to the last named rail and its other end slidably engaged with the first named rail and bolts welded to similar ends of different plates and passing through the rail web.

In testimony whereof we have hereunto set our hands.

CHARLES H. CLARK.
EDWARD WALTER JANSEN.
CHESTER F. GAILOR.